United States Patent [19]

Déléris

[11] 4,347,820

[45] Sep. 7, 1982

[54] PROCESS AND APPARATUS FOR ELECTRONIC ANGLE OF ADVANCE CORRECTION IN RESPONSE TO PINGING AND ENGINE CHARGE

[75] Inventor: Robert Déléris, Bailly, France

[73] Assignee: Regie Nationale des Usines Renault, Boulogne-Billancourt, France

[21] Appl. No.: 215,057

[22] Filed: Dec. 10, 1980

[30] Foreign Application Priority Data

Oct. 12, 1979 [FR] France .................................. 79 30179

[51] Int. Cl.³ .......................... F02D 5/04; F02P 11/02
[52] U.S. Cl. ..................................... 123/417; 123/425
[58] Field of Search ............... 123/417, 425, 418, 419, 123/415, 422, 423; 73/35, DIG. 4

[56] References Cited

U.S. PATENT DOCUMENTS 4,002,155  1/1977  Harned et al.
4,282,841  8/1981  Takagi et al. ........................ 123/425
4,289,102  9/1981  Katsumata et al. .................. 123/425

FOREIGN PATENT DOCUMENTS

2845351  5/1979  Fed. Rep. of Germany ...... 123/417

Primary Examiner—Raymond A. Nelli
Attorney, Agent, or Firm—Oblon, Fisher, Spivak, McClelland & Maier

[57] ABSTRACT

A process and apparatus for electronic angle of advance correction in response to pinging and engine charge, which calculates and adjusts the optimization of the advance of an internal combustion engine by detecting pinging, including an integrator with an integration capacitor, and a microprocessor including in particular a counter connectable to a pressure transducer, a calculating stage for calculating the average integrated noise value, a calculating stage for calculating a pinging detection threshold, and a calculating stage for calculating the angle decrementing value to be transmitted to an output stage.

14 Claims, 6 Drawing Figures

PROCESS AND APPARATUS FOR ELECTRONIC ANGLE OF ADVANCE CORRECTION IN RESPONSE TO PINGING AND ENGINE CHARGE

BACKGROUND OF THE INVENTION

1. Field of the Invention

This invention relates to electronic angle of advance correction for a controlled-ignition internal combustion engine in response to pinging or knocking and engine charge.

2. Description of the Prior Art and Related Patent Applications

Improvement of the automotive combustion cycle has always been a concern of the motor mechanic and was one of the guiding elements in the modification of combustion chamber architecture and the increase in the compression rate. Indeed, this latter parameter directly conditions the engine's thermodynamic efficiency. Unfortunately, the increase in the compression rate shifts the zone where the pinging appears towards the peak of the torque curve applied to the engine as a function of the angle of advance, and if the engine's compression rate continues to be raised, the advance protection clearance in relation to the pinging causes the engine to operate with characteristics which penalize it more than with a lower compression rate. Nonetheless, it may be worthwhile to make use of engines with high compression rates, in particular to improve the combustion efficiency in partial charges. To this end, if it is desired to keep an engine with acceptable acceleration performances, it should not be penalized in its transitional phases, and it should be protected from the appearance of pinging when it operates in a stabilized phase.

Various devices for protecting an engine from pinging are known to the technician. These involve either increasing the richness of the mixture or reducing the advance. The first solution is implicitly achieved in the fuel-mixing device by means of an accelerator pump which enriches the mixture in acceleration phases and with the carburetor's compensating devices acting in the vicinity of the full charge, which also enrich the mixture; the second solution is really only effective when the engine is operating at a stabilized rate.

In related commonly owned U.S. patent application Ser. No. 141,147 filed Apr. 17, 1980 and relating to a "Process and System for Computation and Adjustment of Optimum Ignition Advance," there is disclosed a process according to an initial aspect of the invention for calculating and adjusting the optimization of the advance in an internal combustion engine by means of a system for detecting pinging with the aid of a transducer, such as an accelerometer rigidly attached to the engine's cylinder head. This process is noteworthy in that the accelerometric signal is treated in analog form, including in particular the integration of the signal inside a given window; the resulting signal converted to numerical form; an average value C calculated proportional to the preceding n pings; two thresholds of comparison $S_1$ and $S_2$ calculated which are each a linear function of the average value C calculated previously; the numerically integrated accelerometric value compared to each of these thresholds, and from them the deduction of the presence or absence of an audible pre-ping and/or ping value which is then used to act on the programmed advance of the electronic ignition. In the same patent application, and according to a second aspect of the invention, there is disclosed a system for calculating and adjusting the optimization of the advance in an internal combustion engine by means of a system for detecting pinging by means of a transducer such as an accelerometer rigidly attached to the engine's cylinder head. This system is noteworthy in that it includes means for analog processing of the signal taken from the accelerometer, including in particular an integrator, logical integrator control means, an analog-digital converter, and a micro-computer including in particular a sequencer, a stage for calculating an average value C proportional to the preceding n pings, two stages for calculating comparison thresholds ($S_1$, $S_2$) which are each a linear function of the average value C previously calculated, and means for deducing the existence or absence of an audible pre-ping and/or ping value.

In this previous device, the utilization of an average value for n pings takes up a good deal of space in the micro-computer's memory. Studies pursued since the filing of this first application have shown that the average value C can be calculated by taking into account the preceding average value affected by a multiplier coefficient k and by taking into account the new measured value, and that it is not absolutely necessary to calculate two ping thresholds, the use of a "pre-ping threshold" being non-essential. However, the cylinders are treated successively one by one for detection, and the average value C is calculated from the data relating to a given cylinder at a given moment. There are thus as many average values as there are cylinders. It is therefore preferable to calculate only one ping threshold and to take into account data relating to the engine charge in order to determine the strategies for shifting the advance.

SUMMARY OF THE INVENTION

Accordingly, one object of this invention is to provide a novel process and apparatus designed preferably to modify differently the angle of advance upon detecting ping signals depending on the engine's operating state and the time elapsed since detection of the last ping signals. In the engine's stabilized operating phases, the appearance of ping signals is the result of a shift in the ping limit under the influence of parameters which were not taken into account in programming the law of advance. It is therefore appropriate to shift the point of advance in order to eliminate the pinging without excessively readjusting the engine. This shifting is then progressively decremented as a function of the number of ignitions in order to return to the basic programmed law. In the engine's transitional operating phases, especially during acceleration, the appearance of ping signals is the result of a maladaptation of the richness of the mixture or of excessive response time in the ignition device. It is therefore necessary to shift the point of advance by a greater value than previously in order to make the ping signals disappear. Furthermore, the decremental shift in this instance as a function of the number of ignitions in order to return to the programmed law must be greater than in the case of the previous operation. In deceleration phases during which the appearance of ping signals is virtually nil, the device must be planned to return the decrementing devices to zero. However, caution should be exercised in the resetting of the shift to wait after an acceleration in order to anticipate the decrementing during two or more close accelerations separated by decelerations; this phenomenon occurs, for example, during a change of ratios in the transmission.

The most effective method for measuring and detecting the appearance of pinging is analysis of the pressure signals in the combustion chambers. This solution is costly because of the type of transducers it requires and their number; one per cylinder. It is therefore preferable to analyze the vibrations of the engine's cylinder head by means of a seismic accelerometer. The accelerometer's signal is processed by a band-pass filter centered on the resonance frequency of the combustion chamber so as to eliminate as much as possible noises located outside the resonance band of the combustion chamber. A half- or full-wave rectification makes it possible to transform the alternating signal into a direct signal. Examination of this signal shows a component due to the variable-amplitude combustion noise as a factor of the engine's revolution speed corresponding to excitation of the cylinder head by the valves. Integration of the accelerometer signal, filtered and rectified in an angular window centered around the pressure peak in the cylinder makes it possible to increase the dynamics of the measurement and make the analysis only in a zone where pinging is possible. A window starting at the top dead center (T.D.C.) of each cylinder and lasting between 30 and 40 degrees of crankshaft rotation gives acceptable results on all types of engines used. From the integrated signal and after comparison with a predetermined threshold, it is possible to detect electronically the presence of pinging.

One of the characteristics of the present invention lies in the utilization of a detection threshold that varies according to the average value of the integrated signal, cylinder by cylinder. This makes it possible to take into account any straying of sensitivity of the transducer used, the gain in the processing electronics, the noise proper to a given engine type, transmission of noise through the cylinder head, the position of the accelerometer on the engine's cylinder head, and the noise level proper to each cylinder. Any window generation method can be used, such as the P.L.L. loop with phase interlock synchronized on a T.D.C. signal, optical coder, or generation from electronic ignition associated with the present invention as it is realized.

From the noise data relating to combustion during an engine cycle, there is determined an average noise value, then a threshold value which is a criterion for detection of pinging; then there is defined a decremental value relative to the law of advance if there is or was detection of pinging, and this decremental value is sent to the main advance calculator. All of this processing can be done by an analog process or by a numerical process, but considering the technological progress in digital circuits and the ever more current utilization of microprocessor circuits, the choice of the invention for a practical implementation makes use of a type 8048 type microprocessor produced by the American film "INTEL."

Digital coding of the integrated noise value could be achieved with the aid of an analog-digital converter. In order to optimize the number of components, the invention employs a two-rack integrator technique. After charging the integrator's capacitor for the duration of the measurement window, it is discharged at constant current and the discharge time is measured; this is directly proportional to the value of the voltage integrated. On one of its outputs the microprocessor delivers a rectangular signal at a frequency of 400 kHz; it is only necessary to count with the internal processor counter the number of impulses during the integrator's discharge phase. A relatively simple method for finding out the engine's operating state is to analyze the pressure in the intake manifold. It is then possible to define operation at full charge or at partial charge by comparison with a fixed threshold; by differentiation with the preceding cycle, it is deduced whether it is in acceleration, positive derivative, deceleration, negative derivative, or stabilized operation, no derivative. In order to reduce the number of components, a digital-output pressure transducer is selected delivering a frequency according to the pressure in the intake manifold, and the microprocessor's internal counter is used in its operating mode as a frequency counter. To do this we need only count with the microprocessor's internal counter for a determined period of time the number of impulses delivered by the pressure transducer. The main advance calculator, making parallel advance calculations from a programmed cartography, operates independently of the correction signal generator according to the invention and queries the latter's microprocessor on the advance correction value through an external break. The microprocessor sends back to it a train of impulses the number of which is equal to the value of the decrementing to be done. It is assumed that any decrementing action is done in the same direction, reducing the advance. Use of a microprocessor therefore makes it possible to acquire data, perform calculations, and obtain results, the most important part being the processing of these data in order to obtain a result which is here the decrementing value for the angle of advance in the presence of signals revealing the existence of pinging with a decrementing value modulated as a function of the engine's operating mode and of time. The average integrated noise value in the measurement window being variable, mainly as a function of speed, it is preferable to calculate an average after each combustion cycle by individualizing it cylinder by cylinder. In order to limit the memory space corresponding to the storage of x elementary values corresponding to x preceding ignitions and of n cylinders, it is preferable to use an average value re-updated by the last noise value. To the preceding average value is added algebraically a part of the difference between the last value and the preceding value according to the formula:

$$\overline{S_n} = \overline{S_{n-1}} + \frac{A_i - \overline{S_{n-1}}}{k}$$

in which k is a filtering constant and is generally a value dependent on the sign of the difference in order to obtain a good dynamic response in the transitional phases.

From the average value thus defined, we determine a threshold value which determines the detection of pinging by taking into account the distribution of the previously defined average value, at low speeds where $\overline{S_n}$ is a low value, decrementing at a constant value is sufficient. In the case of higher speeds where $\overline{S_n}$ has a high value, the value of $\overline{S_n}$ is included in calculating the ping threshhold, corresponding to the formula:

$$C = K_2 + K_3 \cdot \overline{S_n}$$

in which $K_2$ and $K_3$ are coefficients dependent solely on the physical parameters associated with use of the invention, to wit: type of engine used, gain and placement of the ping pick-up.

Operation of the engine, whether on stabilized charge or not, creates a decrementing and a return to the programmed law of advance at the time of ping detection. In stabilized operation, upon each ping detection is low so as not to maladapt the engine; return to the programmed law is relatively slow so as not to cause a pumping phenomenon. In acceleration phase, it is appropriate to have protection against pinging, hence the decrementing is major if pinging is detected, but return to the programmed law is rapid. In deceleration phase, there is nothing to fear from pinging, so the decrementing devices are reset in order to return as quickly as possible to the programmed law. In the case of a change of speed where there are successive phases of acceleration, deceleration, and acceleration, resetting should be delayed under the same decrementing conditions for purposes of the second acceleration and so as to be already decremented if there was a detection of pinging during the first acceleration.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE PREFERRED EMBODIMENTS

Figure 1:
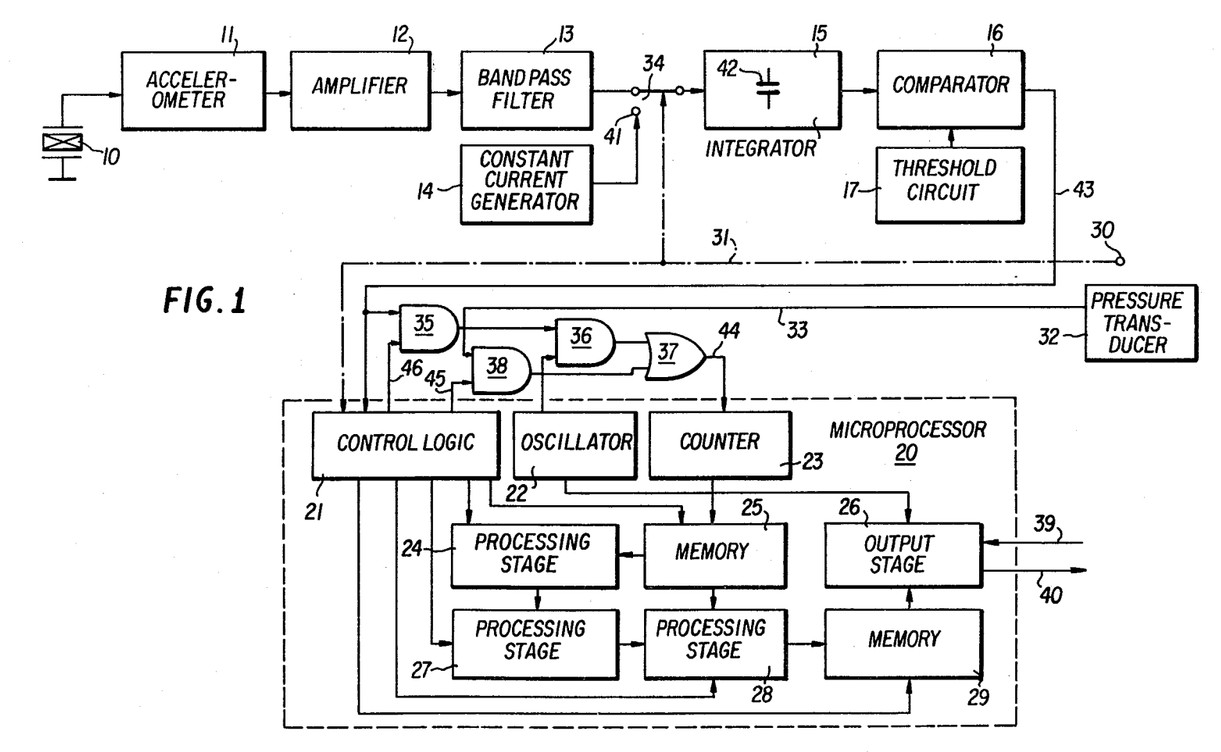
FIG. 1 is a block diagram of the general architecture of the electronic circuit according to the invention.

Referring now to the drawings, wherein like reference numerals designate identical or corresponding parts throughout the several views, and more particularly to FIG. 1 thereof, a piezoelectric accelerometer 10 screwed onto the cylinder head of an internal combustion engine, which has not been shown, at an appropriate point is connected by its output to a charge amplifier 11 itself connected to an active band-pass filter 12 for example in the band of frequencies from 6 to 9 kHz. The output of the band-pass filter is connected to the input of a rectifier 13 connected to an integrator 15 through a switch 34 of which a second input terminal 41 is connected to a constant-current generator 14 in order to be able to discharge at constant current a capacitor 42 located in the integrator 15, which has been charged with the signal put out by the accelerometer 10 after the latter had been amplified, filtered, rectified and integrated during the passage of a measurement window, the duration of which is controlled from point 30 by a conductor 31 acting on the position of the swinging arm of the switch 34. The integrator 15 is connected by its output to the first input of a comparator 16 receiving on its second input a comparison threshhold value established in a circuit 17. The output of the comparator 16 is connected by a conductor 43, on the one hand, to an input in a control logic 21 located inside a microprocessor 20 which is, for example, of the 8043 type of the American firm "INTEL," and on the other hand to a first input of a logic AND gate 35 connected by a second input 46 to an output of the control logic 21. The microprocessor 20 includes, in addition, the following states: an internal oscillator 22 and a counter 23, a processing stage 24 for the average noise value, a processing stage 27 for the ping threshhold detection, a processing stage 28 for the decrementing signal value, a data memory 25, an output stage 26 for the decrementing value and a memory 29 for the decrementing value. The control logic 21 is connected by a second input to the conductor 31 controlling the position of the switch 34 and by its outputs to the processing stages 24, 27 and 28 and to the memories 25 and 29, and by a conductor 45 to an input of a second logic AND gate 38 connected by its second input and a conductor 33 to a pressure transducer 32 which measures the pressure in the engine's intake manifold. The internal oscillator 22 is connected by a first output to the output stage 26 of the decrementing value and by a second output to the first input of a third logic AND gate 38 and by its output 44 to an input in the counter 23 which is connected by its output to the data memory 25. The data memory 25 is in communication with the processing stage of the average noise value 24 and with the processing stage of the decrementing value 28, the latter connected by an input with the processing stage of the ping threshhold detection 27 and by an output to the decrementing value memory 29, the latter connected by an output with the output stage 26 of the decrementing value. This latter output stage 26, upon receiving a "send" signal transmitted on a conductor 39, transmits on its output conductor 40 a number of impulses equal to the calculated decrementing value in the direction of the central angle of advance value processor.

The operation of the control logic unit 21 located inside the microprocessor 20 will now be described with the aid of the flow chart in FIG. 2.

Figures 2, 4:
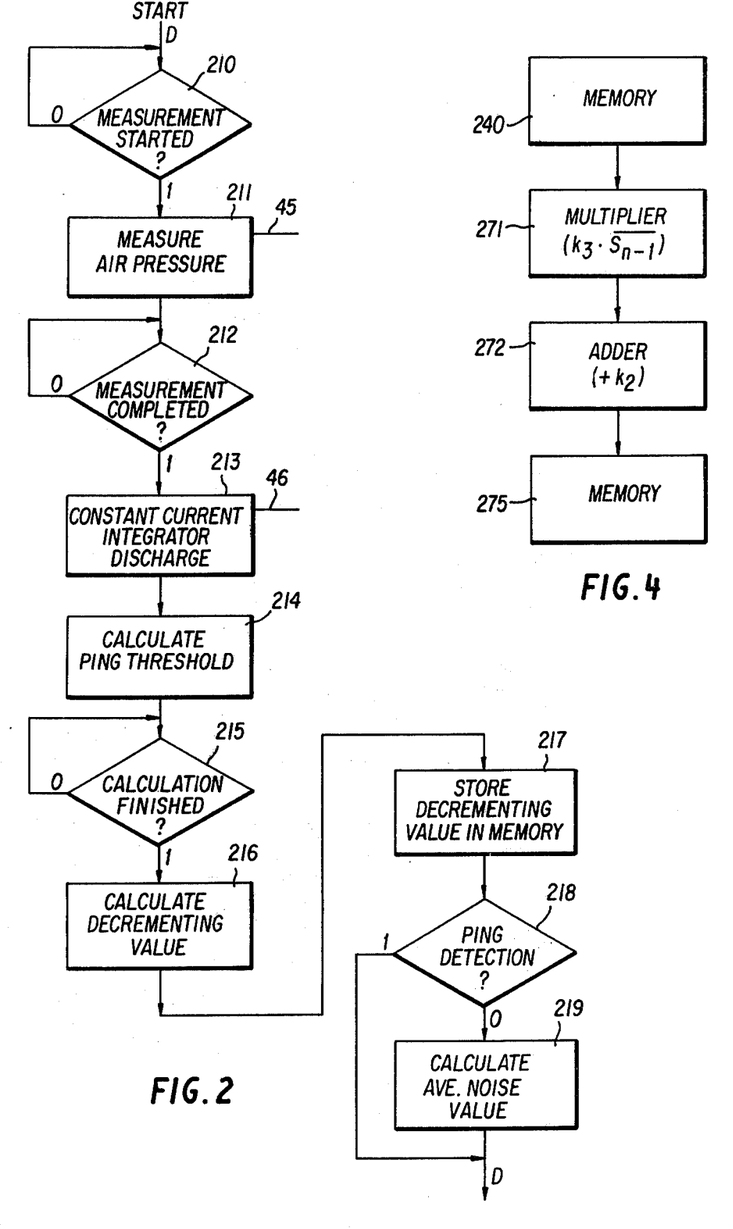
FIG. 2 is a flow-chart diagram illustrating the operation of the microprocessor's control logic.
FIG. 4 is a flow-chart diagram illustrating the operation of the stage of ping threshhold value calculation inside the microprocessor.

Generally speaking, the start of the flow-chart is reference D; an arrow accompanied by this letter, as is the case at the bottom of FIG. 2, means a return to the start of the flow-chart. As is usual in programmed logic, the various branch joint tests made by comparator members are marked as vertical-diagonal diamond shapes, while the operations are marked as rectangles. The test results are marked 1 when positive and 0 when negative, and this determines the different branch joint routes.

In an initial stage 210, the system is awaiting the start of the measurement window communicated by the conductor 31 in FIG. 1. When the corresponding signal has been received, we move on to step 211 during which the air pressure in the intake manifold is measured. For this purpose, through the conductor 45 leaving the control logic 21 in FIG. 1, the impulses delivered by the pressure pick-up 32 are authorized to be entered into the counter 23 after the passage of the signal in the logic gates 38 and 38 for a determined period of time. The counter 23 works as a frequency counter so as to obtain a numerical value showing the air pressure in the intake manifold. The ping measurement window is placed just after the T.D.C. and lasts for example for 32° of the flywheel. During this noise measurement window, the signal transmitted by the conductor 31 directly connects the integrator 15 onto the output of the filter 13 through the intermediary of the switch 34. The following diamond 212 brings about the wait at the end of the window which takes place upon the arrival of a low-level logic signal on the conductor 31 in FIG. 1. Upon reception of this signal, the following step 213 is begun. It corresponds to the decreasing slid of the integrator 15, that is, by the switch 34 the constant current generator 14 is connected to the input of the integrator 15 and causes the discharge of the capacitor 42 which had been previously charged. By the conductor 46 of the control logic outlet 21 in FIG. 1, the impulses delivered by the internal oscillator 22 are authorized through the intermediary of the AND logic gates 35 and 36 to be applied to the counter 23 during the time when the charge value of the capacity 42 integrator 15 is greater than the comparison threshold given at the output of stage 17. The counter 23 then works as a period counter in order to appraise the length of discharge of the capacitor 42 which is the measurement of the maximum potential to which it was previously charged and which corresponds to the integrated noise value in the measurement window determined from the input 30.

In the following step 214, the control logic 21 undertakes calculation of the ping threshhold in the stage 27 of the microprocessor during the discharge of the capacitor 42. The diamond 215 corresponds to the waiting for the end of the noise potential measurement. Once this measurement is finished, it allows moving on to step 216, where the control logic 21 undertakes calculation of the decrementing value in the stage 28 of the microprocessor 20. Once this calculation is completed at step 217, the entry into the memory 29 of the decrementing vaule which has just been calculated at 28 is made under the control of logic 21. The following diamond 218 corresponds to a test of the ping detection. Indeed, the last step 219 corresponds to the calculation of the average noise value in stage 24 of the microprocessor 20, and this calculation does not take place if no pinging was detected. In the presence of pinging, this last step is eliminated.

Figure 3:
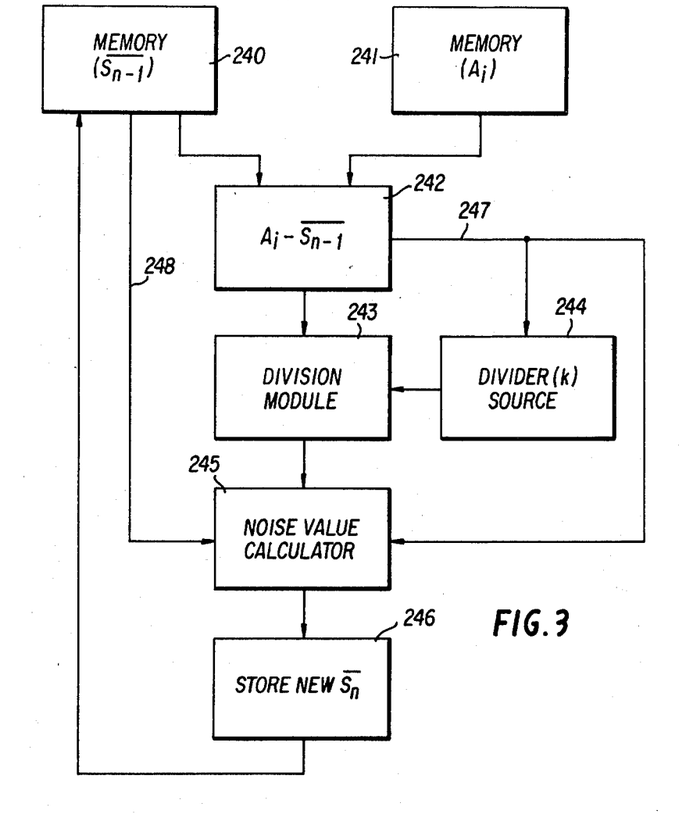
FIG. 3 is a flow-chart diagram illustrating the operation of the stage of average noise value calculation inside the microprocessor.

FIG. 3 is a flow-chart illustrating the operation of the calculation stage 24 of the average noise value inside the microprocessor 20. This calculation stage 24 includes a storage memory 240 for the average noise value $\overline{S_{n-1}}$ and a storage memory 241 for the instantaneous noise value $A_i$, both connected by their outputs in parallel to the inputs of a stage 242 in which the calculation of the difference $A_i - \overline{S_{n-1}}$ is performed. According to the sign of this difference which appears on an output conductor 247, a stage 244 selects a value k as divider, introduced into a stage 243 called division module which is also connected to the output of stage 242, giving the value of the difference $A_i - \overline{S_{n-1}}$. The division module 243 is connected by its output to a stage 245 in which calculation of the new noise value is performed according to the formula:

$$\overline{S_n} = \overline{S_{n-1}} + \frac{A_i - \overline{S_{n-1}}}{k}$$

This stage 245 is connected by the conductor 247 to the output of the stage 242 in which the difference $A_i - \overline{S_{n-1}}$ was calculated in order to receive the sign from it, and also to the storage memory 240 through the intemediary of the link 248 to receive the preceding average noise value $\overline{S_{n-1}}$. The calculation stage 24 ends in a stage 246 representing a step during which the new average value $\overline{S_n}$ which has just been calculated is stored in the memory 240 in preparation for the following calculation.

FIG. 4 is a flow-chart showing the details of the calculation stage 27 of the ping threshhold value inside the microprocessor 20. This new calculation stage includes, first, the memory 240 for the average noise value, which is that used in the preceding calculation stage 24. The memory 240 is connected by its output to the input of a stage 271 in which the multiplication $k_3 \cdot \overline{S_{n-1}}$ is performed, then from stage 271 we move on to stage 272 where the value $k_2$ is added to the previously calculated amount. The calculation stage 27 ends in a storage memory 275 for the ping threshhold value C, which thus corresponds to the equation:

$$C = k_3 \cdot \overline{S_{n-1}} + k_2$$

in which $k_2$ is a decrementing value and $k_3$ a multiplier coefficient.

Figure 5:
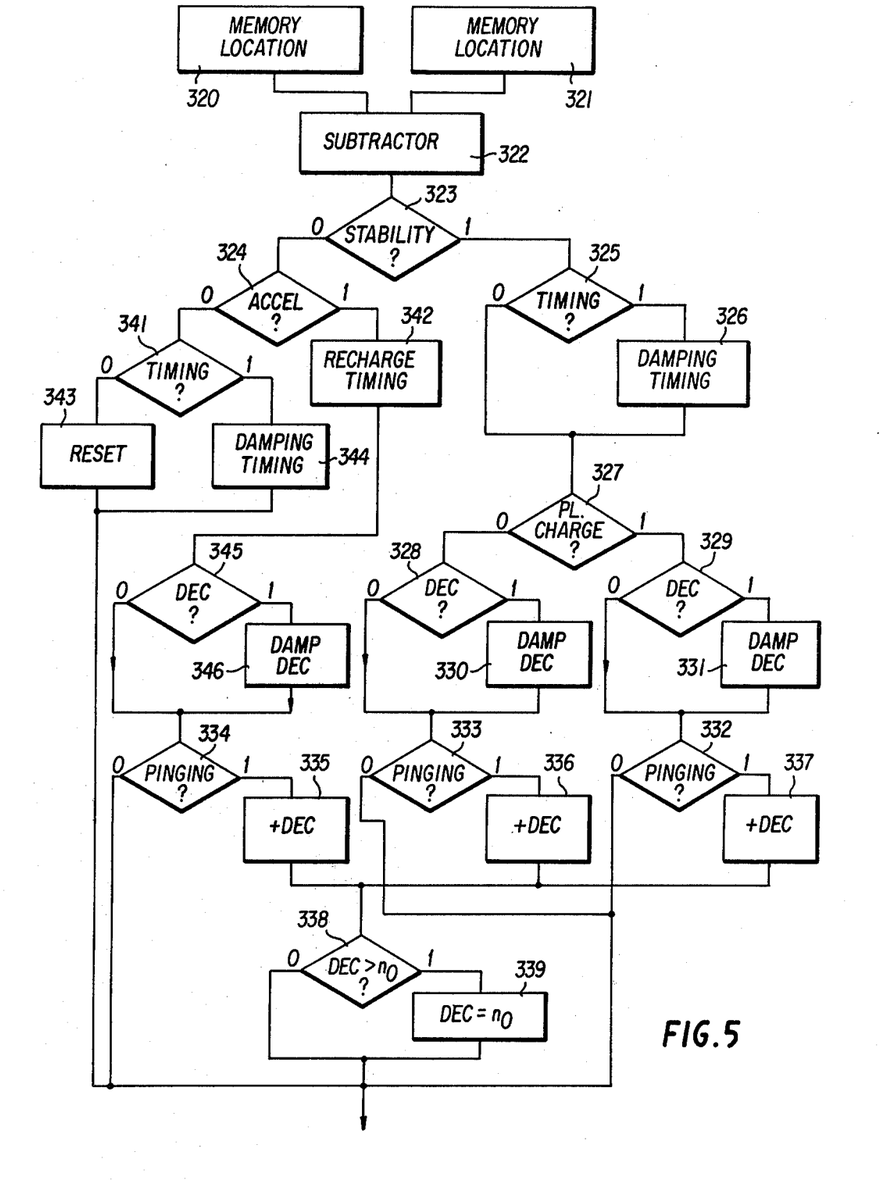
FIG. 5 is a flow-chart diagram illustrating the programming of the microprocessor applying a strategy resulting in a calculation of the angle of advance decrementing value as a function of the pressure and the pinging.

FIG. 5 is a flow-chart of the calculation stage 28 of the decrementing correction value inside the microprocessor 20, applying a strategy according to the pressure, the pinging, and the operating cycle, to wit: acceleration, deceleration, charge rate stabilized or not, partial charge rate or full charge. Starting from a memory location 320 where the measurement of the preceding cycle's pressure has been memorized and a memory location 321 indicating the measurement of the calculation cycle pressure and entry into the memory in preparation for the following cycle. These two memories 320 and 321 are connected by their outputs as inputs to a stage 322 in which the difference in pressure is calculated between the two preceding measurements, from which value the strategy is determined. At post 323 it was examined whether there is stability in the pressure rate, that is, if the difference in pressure in absolute value is less than a threshhold $p_1$: if yes, then proceed to the right of the diamond, otherwise to the left. Assuming that at 323 it is noted that the pressure is not stable, then at post 324 is examined whether an acceleration state exists. If yes, processing is continued to post 342 where we recharge to the value $m_0$ the length of the timing memorizing the acceleration. An acceleration is thus memorized with the aid of a numerical monostable located in a timing memory of the calculation stage 28.

By way of example, the value $m_0$ varies from 400 to 800 ignition strokes. Proceeding then to the diamond 345 at which point the DECREMENTING test is performed to determine whether there is or is not advance decrementing. If there is in fact decrementing, processing proceeds to post 346 where the decrementing is damped every $m_1$ ignitions, $m_1$ being a numerical value between 150 and 300. Proceeding then to the PINGING test at 335 during which all decrements are increased by the amount $n_1$, $n_1$ being a numerical value between 6 and 8. After this a second test is done on DECREMENTING to determine a maximum decrementing value $m_O$ at 338. If the test proves positive, at 339 processing proceeds to the operation consisting of bringing the decrementing back to $m_O$ maximum value, after which the present cycle is finished.

If the tests 334 and 338 have shown a negative result, the processing leaves the flow-chart. If the test 324 showed no acceleration, processing proceeds to test 341 on TIMING.

With the aid of TIMING recorder, a transitional acceleration is temporarily memorized, which may facilitate the engine's operation by easing its burden for the immediate future. Indeed, if the following scenario for the driver is imagined: he accelerates and causes pinging; immediately after he eases up on the pedal to change speeds, then accelerates again; the engine then takes advantage a second time of the correction made during the preceding acceleration to pass through a second acceleration without pinging.

The TIMING recorder corresponds to a numerical monostable which is damped as soon as acceleration has ceased. The TIMING recorder is a numerical monostable which is put to its maximum by an acceleration and which makes it possible to prevent any decrementing resetting operation when deceleration is taking place.

If the TIMING test is positive, processing proceeds to 344 where the operation consists of damping the TIMING recorder at each ignition. If the test 341 yields no result, processing proceeds to 343 where the operation consists of bringing all decrementing back to zero. The operations 343 and 344 have a common output which takes them directly to the end of the flow-chart. Having reviewed the strategy followed when the test 323 has revealed instability in the pressure, processing proceeds to examine the strategy when the test 323 shows that the pressure is stable. Processing leave the diamond 323 on its right and come to test 325 on TIMING. If this test is not negative, processing proceeds to operation 326 which consists of damping the TIMING as in operation 344.

The output of the operation 326 joins the left output of the test 325, if the TIMING test is negative, and this joint output leads to the test 327 consisting of determining whether the internal combustion engine is operating at full charge. The result determines two slightly different strategies, although they follow parallel paths.

These two strategies for operating at stabilized charge differ from the strategy for operating at unstabilized charge. Indeed, in the first two cases, processing deals with advance near the pinging, and the corrections are only made on the cylinder for which the noise has just been measured; in the other case, the advance correction affects all the cylinders.

Assuming that the engine is in full charge, the test 329 establishes whether or not there is advance decrementing. If it is found that there is indeed decrementing, the operation 331 consists of damping the decrementing every $m_3$ ignitions, $m_3$ being a numerical quantity whose value is between 1000 and 2000. The output of the operation 331 joins the left output of the test 329 if it is found that there is no decrementing, and processing then proceeds to the test 332 to determine whether or not there is PINGING. If there is, processing proceeds to operation 337 which consists of increasing the DECREMENTING for the cylinder in question by the amount $m_3$, a positive value equal to one or two. At the output of the operation 337 processing then continues on to test 338, already encountered previously, during which is determined the maximum decrementing value. If the test 332, like the previous test 334, makes it possible to establish that there is no decrementing, the present cycle is finished.

If the test 327 on FULL CHARGE showed that operation is not under that condition, processing proceeds to the test 328 to determine whether or not there is DECREMENTING. If it is found that there is in fact decrementing, the operation 330 consists of damping this decrementing every $m_2$ ignitions, $m_2$ being a numerical amount whose value is between 400 and 800. The output of the operation 330 joins the left output of the test 328 if no decrementing is found, and processing proceeds then to the test 333 to determine whether or not there is PINGING. If yes, processing goes on to the operation 336 which consists of increasing the decrementing for the cylinder in question by the amount $n_2$, a positive value that may be from three to five. At the output of the operation 336 processing proceeds on to the test 338, already encountered previously, during which is determined the maximum decrementing value. If the test 333, like the previous tests 332 and 334, makes it possible to establish that there is no pinging, the present cycle is finished.

Figure 6:
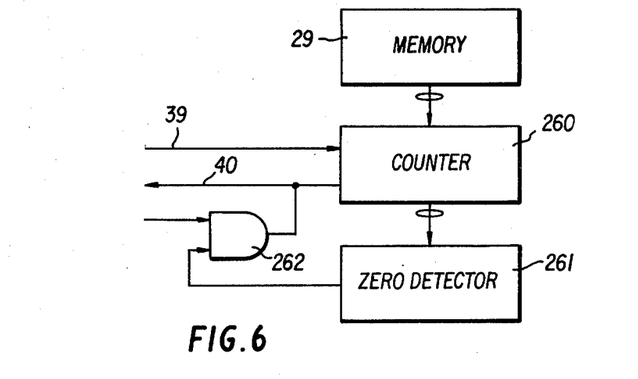
FIG. 6 is a block diagram of an implementation of the output of the microprocessor communicating with the main advance value processor.

FIG. 6 shows an implementation of the output stage 26 of the calculator 20. This stage 26, working according to a method of operation by external breaking, is not marked in the flow-chart in FIG. 2 as its placement is not defined in the succession of logical tasks but is defined by the main advance calculator when a corrected decrementing value is needed. We again find the conductors 39 and 40 already shown in FIG. 1. The conductor 39, called sending conductor, is attached to the charging input of a counter 260 connected by its inputs to a memory 29 for the decrementing value and by its outputs to a zero detector 261. The output of the latter is connected to an input in a logic AND gate 262 of which the second input receives the impulses created by the internal clock of the microprocessor 20. The output of this AND gate 262 is connected to the clock input of the counter 260 which is also connected to the conductor 40 with the output of the microprocessor 20 which transmits the decrementing value to the main angle of advance calculator.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for electronically correcting the angle of advance of an internal combustion engine by means of detection of combustion noise signals with the aid of a transducer such as an accelerometer rigidly attached to the engine's cylinder head, wherein an accelerometric signal from the transducer is subjected to analogue processing, including in particular integration in a measurement window of given width to deduce therefrom a value for the noise signal $A_i$ integrated in said measurement window, comprising:

calculating an integrated average noise value $\overline{S_n}$, which is constantly re-updated by the last value taken, according to the formula, $$\overline{S_n} = \overline{S_{n-1}} + \frac{A_i - \overline{S_{n-1}}}{k}$$

in which $\overline{S_{n-1}}$ is the preceding average value; $A_i$ is the last value taken for the integrated noise; k is a numerical filtering coefficient for re-updating the average value;

defining a pinging detection threshold C by the formula, $$C = k_3 \cdot \overline{S_{n-1}} + k_2$$

in which $k_3$ is a multiplier coefficient and $k_2$ a decrementing value;

comparing the last integrated noise value $A_i$ to the pinging detection threshhold C defined from the value $\overline{S_{n-1}}$ relating to the same cylinder; and correcting according to the result of the preceding comparison the point of advance under a strategy which depends on the engine's operating state.

2. A process according to claim 1, further comprising:

calculating an average value $\overline{S_n}$ for each cylinder in the engine from the noise values $A_i$ relating to that same cylinder.

3. A process according to claim 2, further comprising:

selecting a value for coefficient k, $4 \leq k \leq 10$, when the last value of $A_i$ is less than the average value $\overline{S_{n-1}}$, selecting a value for coefficient k, $2 \leq k \leq 3$, when the last value of $A_i$ is between the average value $\overline{S_{n-1}}$ and the pinging detection threshhold C, and not calculating a new value $\overline{S_n}$ when the last value of $A_i$ is greater than the pinging detection threshhold C.

4. A process according to claim 1, further comprising:

measuring the pressure in the intake manifold;

memorizing the value of a measurement until the following measurement cycle; and determining the engine's operating state by differentiation of the last two pressure measurements and by comparison of the pressure measurement with a fixed threshhold.

5. A process according to claim 1 or 4, further comprising:

increasing, upon detection of pinging, the decrementing value of the point of advance by a major value in acceleration phase, by a medium value in stabilized operation, partial charge, and by a low value in stabilized operation at full charge;

clipping the decrementing value, which must not exceed a maximum value, defining the reduction gradient of the decrementing value in the absence of any detection of pinging, as high in acceleration phase, medium in stabilized operation, partial charge, and low is stabilized operation, full charge; and returning the decrementing value to zero in deceleration phases.

6. A process according to claim 5, comprising:

raising, upon detection of pinging, the decrementing value for all the cylinders in acceleration phase and for the single cylinder in question in stabilized phase.

7. A process according to claim 5, comprising:

creating a time delay at each acceleration which blocks the resetting of the decrementing values in deceleration phases immediately following an acceleration phase.

8. A process according to claim 5, comprising:

always reducing the subsequent correction of the angle of advance following the initial increase in the decrementing value upon the detection of pinging.

9. A process according to claim 1, comprising:

choosing the pinging threshhold at the lower limit of the high-noise strokes when the engine is operating at full charge.

10. An electronic angle of advance corrector responsive to pinging and charge for an internal combustion engine, wherein the correction is formed of a transducer such as an accelerometer rigidly attached to the cylinder head of the engine of the type including means for analogue processing of the signal picked up by the accelerometer, including in particular an integrator, logic circuit means for control of the integrator, a high-tension comparator, a microprocessor of the type including a control logic, an internal oscillator, a counter and memories, and an output stage receiving in particular the successive decrementing correction values calculated by the microprocessor, comprising:

said integrator including an integration capacitor in which is memorized the noise signal detected through the accelerometer, a constant current system for discharging the capacitor;

the counter of the microprocessor selectively connected either to a pressure transducer or to the internal oscillator by means of a set of logic gates having AND and OR functions; and the microprocessor including, a calculating stage for computing the average integrated noise value $S_n$, a calculating stage for computing a pinging detection threshhold, and a calculating stage for computing the decrementing correction value to be transmitted to the output stage.

11. A corrector according to claim 10, comprising:

said internal counter of the microprocessor operating as a frequency counter in connection with the pressure pickup of the intake manifold for the duration of said measurement window, and operating as a period counter outside of said measurement window to measure the duration of discharge from the capacitor of the integrator.

12. A corrector according to claim 11, comprising:

said microprocessor having control logic for controlling said set of logic gates;

means for enabling said internal counter to enter the impulses delivered by said pressure pick-up for the duration of said measurement window and to enter the impulses delivered by the internal oscillator during the time that the charge of said capacitor is greater than a comparison threshhold.

13. A corrector according to claim 10, comprising:

the calculation stage of the decrementing correction value including an initial memory location in which is memorized the measurement of the pressure from the preceding cycle and a second memory location in which is memorized the measurement of the pressure in the following cycle; and a stage for calculating the difference in pressure between the two measurements coupled to these two memory locations.

14. A corrector according to claim 13, comprising:

the calculation stage for the unkeying correction value including a numerical monostable which is put in its peak position by an acceleration and which enables suspension of any decrementing resetting operation if the engine is operating at a transitional rate.

* * * * *

UNITED STATES PATENT AND TRADEMARK OFFICE
CERTIFICATE OF CORRECTION

PATENT NO. : 4,347,820
DATED : September 9, 1982
INVENTOR(S) : Robert Deleris

It is certified that error appears in the above—identified patent and that said Letters Patent is hereby corrected as shown below:

On The Title Page, Item (30) should read

--[30] Foreign Application Priority Data

Dec. 10, 1979 [FR] France......79 30179 --

Signed and Sealed this

Twenty-sixth Day of October 1982

[SEAL]

Attest:

Attesting Officer

GERALD J. MOSSINGHOFF

Commissioner of Patents and Trademarks